Aug. 24, 1965     H. C. WEIDNER, JR     3,202,033

SEALING WASHER AND FASTENING DEVICE

Filed Aug. 13, 1962     3 Sheets-Sheet 1

INVENTOR.
HARRY C. WEIDNER JR.
BY Jack M. Young
ATTORNEY

Aug. 24, 1965  H. C. WEIDNER, JR  3,202,033
SEALING WASHER AND FASTENING DEVICE
Filed Aug. 13, 1962  3 Sheets-Sheet 2

INVENTOR.
HARRY C. WEIDNER JR.
BY Jack M. Young
ATTORNEY

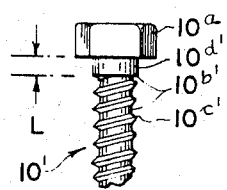
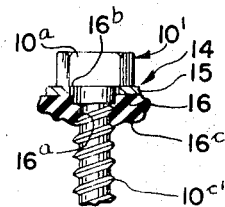
FIG.19  FIG.20
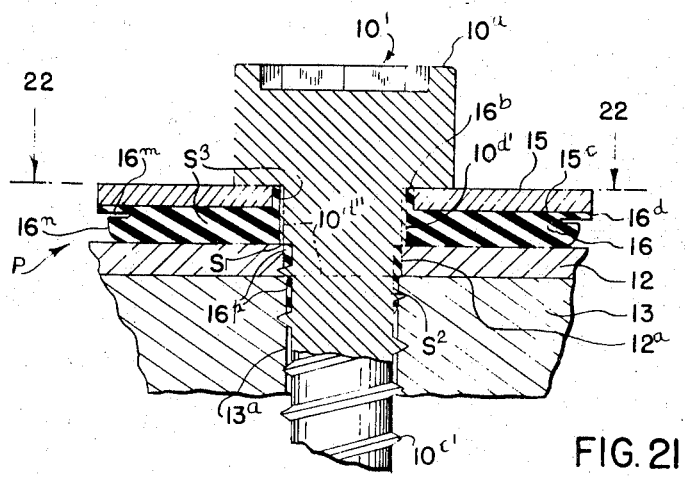
FIG.21
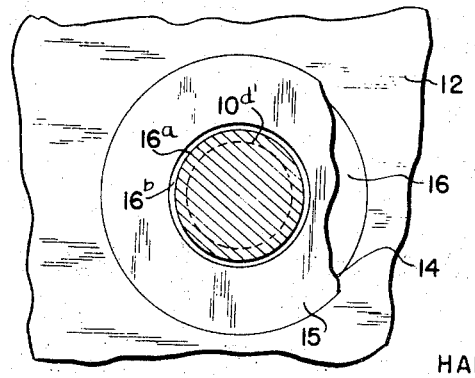
FIG.22
INVENTOR.
HARRY C. WEIDNER JR.
BY Jack M. Young
ATTORNEY

United States Patent Office 3,202,033
Patented Aug. 24, 1965

3,202,033
SEALING WASHER AND FASTENING DEVICE
Harry C. Weidner, Jr., Shaker Heights, Ohio, assignor to The Atlas Bolt and Screw Company, Cleveland, Ohio, a corporation of Ohio
Filed Aug. 13, 1962, Ser. No. 216,360
17 Claims. (Cl. 85—1)

This application is a continuation-in-part of my copending United States patent application for "Washer, Fastener and Sealing Washer, and Method and Apparatus for Making Said Washer," Serial No. 8,109, filed February 11, 1960, which is now abandoned.

This invention relates to improvements in a washer, fastener and sealing washer, method for making said washer, or apparatus for making said washer.

One of the objects of the present invention is to provide a sealing washer having good sealing characteristics, and a long wear life.

Another object of the present invention is to provide a method and/or an apparatus for making said sealing washer.

Another object of the present invention is to provide a shouldered fastener adapted to be used with said sealing washer.

Another object of the present invention is to provide an assembled headed fastener (with or without a shoulder) and sealing washer wherein any shoulder provided is adapted to engage a member into which the fastener is adapted to be driven so as to control the driving and sealing action.

A further object of the present invention is to provide a sealing washer, fastener, fastener and sealing washer, method for making said washer, or apparatus for making said washer characterized by its economy of manufacture or operation, structural or method step simplicity, ease of use, and many functional advantages.

Other features of this invention reside in the arrangement and design of the parts or method steps for carrying out their appropriate functions.

Other objects and advantages of this invention will be apparent from the accompanying drawings and description and the essential features will be set forth in the appended claims.

In the drawings,

FIG. 1 is a longitudinal sectional view through a first form of fastener and a sealing washer with this fastener in assembled position in a hole in a fastener receiving member with said receiving member only partially sectioned;

FIG. 2 is a view of an assembled sealing washer and this first form of fastener with the washer shown in section and having its edge portions cut away;

FIG. 3 is a sectional view taken generally along line 3—3 in FIG. 1 with a portion of one edge of the backing member of the washer broken away;

FIG. 4 is a longitudinal sectional view of a first form of the washer shown in FIGS. 1, 2 and 3;

FIG. 5 is a longitudinal sectional view of a second form of the washer shown in FIGS. 1, 2 and 3;

FIG. 6 is a longitudinal sectional view of a third form of the washer shown in FIGS. 1, 2 and 3;

FIG. 7 is a longitudinal sectional view of a fourth form of the washer shown in FIGS. 1, 2 and 3;

FIG. 8 is a top plan view of any of the washer forms shown in FIGS. 4, 5, 6 or 7;

FIG. 9 is an enlargment of a portion of FIG. 1;

Figure 15:
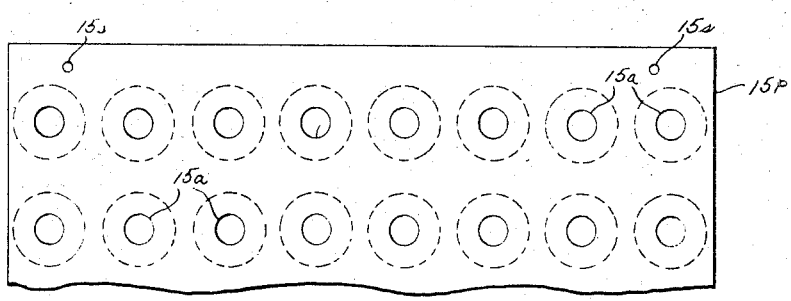
Figure 16:
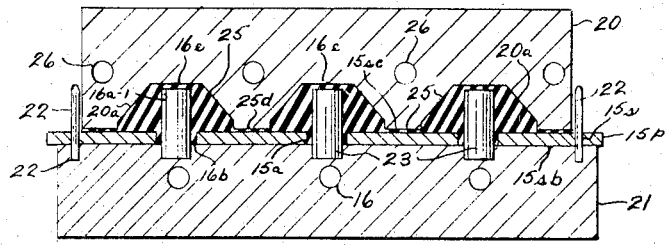
Figure 17:
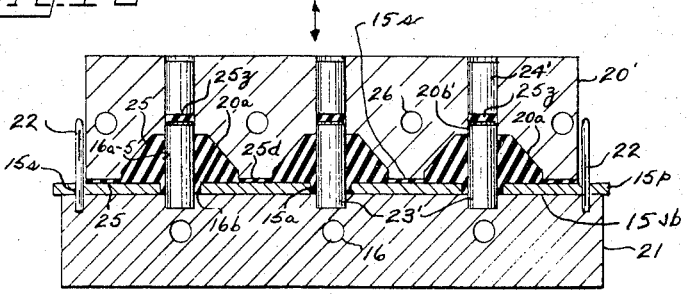
Figure 18:
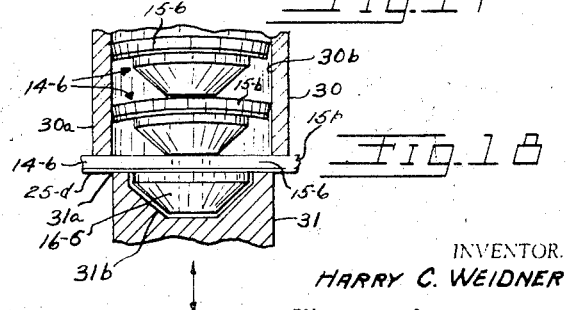

FIGS. 10, 11, 12 and 13 are views corresponding to FIGS. 4, 5, 6 and 7 but respectively of a fifth, sixth, seventh and eighth form of the washer shown in FIGS. 1, 2 and 3 but without the web shown in FIGS. 4–7 across the bottom of the hole therein;

FIG. 14 is a bottom view of any of the washer forms shown in FIGS. 10, 11, 12 or 13;

FIG. 15 is a top plan view of a plate removed from the final molding position in FIG. 16 or 17 and prior to the blanking or cutting of the individual washers therefrom in FIG. 18;

FIG. 16 is a vertical sectional view through the molding apparatus in final molding position for making washers of the type shown in FIGS. 4 and 5;

FIG. 17 is a vertical sectional view through the molding apparatus for making washers of the type shown in FIGS. 10 and 11;

FIG. 18 is a longitudinal sectional view of the stamping or blanking apparatus used to cut the individual washers from the plate in FIG. 15;

FIG. 19 is a side elevational view of a second form of fastener;

FIG. 20 is a view, similar to FIG. 2, of an assembled sealing washer and this second form of fastener;

FIG. 21 is an enlarged longitudinal sectional view, similar to FIG. 1, but using the second form of fastener in FIG. 19 with the shoulder thereof end-stopped against the surface of the fastener receiving member; while FIG. 22 is a sectional view taken generally along line 22—22 in FIG. 21 with a portion of one edge of the backing member of the washer broken away.

Before the sealing washer, fastener, method and apparatus here illustrated are specifically described, it is to be understood that the invention here involved is not limited to the structural details, arrangment of parts, or method steps here shown since the present invention may take various forms. It is also to be understood that the phraseology or terminology herein employed is for purposes of description and not of limitation since the scope of the present invention is denoted by the appended claims.

Washer 14 disclosed herein is useable in many ways but is especially adapted to be used with a bolt, screw, or any type fastening element, such as a self-tapping or machine bolt or screw, bolt, screw, nail etc. Here, washer 14 is shown on either screw or fastening element 10 in FIGS. 1–3 or on screw or fastening element 10' in FIGS. 20–22. Screw 10 has a shank 10b integrally carried with head 10a at one end, having threaded portion 10c thereon, and having washer 14 adapted to telescope thereover to fit under this head. However, it should be readily apparent that washer 14 disclosed herein is adapted to fit under a nut head as well as a bolt head.

The only difference between screw 10 in FIG. 1 and screw 10' in FIGS. 19 and 21 should be readily apparent. In screw 10, the threaded portion 10c on shank 10b has threads extending all the way up to head 10a. In screw 10', shank 10b' has shoulder 10d' located between threaded portion 10c' on shank 10b' and head 10a.

In FIG. 1, fastening element 10 and washer 14 are shown in an assembled or driven position in a fastener receiving member. This type washer 14 is especially adapted to provide many advantages when screw 10 is inserted into a hole in any suitable fastener receiving member. One suitable fastener receiving member 11 is illustrated and includes a building member or wall 13 and roofing or siding member 12 forming the outer building face. This member 12 may be made of metal, protected metal, corrugated asbestos, or other suitable non-metallic material. Here, shank 10b is illustrated as a self-tapping screw shank adapted to form its own threads in previously drilled hole 13a of member 13, while hole 12a in member 12 may be either of the same size as hole 13a or of larger size than hole 13a and the outside diameter of threaded shank 10b in the assembled position in FIG. 1 and may be formed in any suitable manner, such as by pre-drilling, so that member 12 will be firmly retained on member 13 by fastener 10 in the assembled position in FIG. 1. However, it should be readily apparent that the same advantages and mode of operation should be obtained with a conventional screw or bolt (non-self-tapping) screwed into a previously tapped thread in hole 13a.

All of the forms of washer 14 shown in FIGS. 4–7 and 10–13 are shown generically in FIGS. 1, 2, 3 and 9 as washer 14 having backing member 15 and rubber-like sealing member 16 bonded thereto. Each of these eight washer forms will assume the generic shape shown in FIGS. 1, 2, 3 and 9. Now, specific features of the eight forms in FIGS. 4–7 and 10–13 will be described in detail. Washer 14, having members 15 and 16, is illustrated in different forms as washers 14–1, 14–2, 14–3, 14–4, 14–5, 14–6, 14–7, and 14–8 including respectively backing members 15–1, 15–2, 15–3, 15–4, 15–5, 15–6, 15–7, and 15–8 having bonded thereto sealing members 16–1, 16–2, 16–3, 16–4, 16–5, 16–6, 16–7, and 16–8.

Each of these aforementioned forms of backing member 15 has generic features. Each is preferably made of sheet or plate steel but may be fabricated from any suitable rigid and inflexible material, other than metal, to which sealing member 16 may be secured. For example, the backing plate member may be fabricated from Bakelite, or some other material having the desired rigid and inflexible characteristics but is shown specifically herein as being made of steel. Each backing member has a hole 15a extending therethrough, one face 15b adapted to bear against the underside of fastener head 10a in the assembled positions of FIGS. 1 and 2, and an opposite face 15c to which is bonded its sealing member.

In FIGS. 4, 6, 10 and 12, the backing members 15–1, 15–3, 15–5, and 15–7 have faces 15c flat. In FIGS. 5, 7, 11 and 13, backing members 15–2, 15–4, 15–6 and 15–8 have faces 15c concave to provide a dished washer.

Each of these aforementioned forms of sealing members 16 have generic features. Each is formed of any suitable rubber-like material, such as neoprene, natural rubber, synthetic rubber, elastomer, or any other material having suitable resilient and compressible characteristics for providing the sealing and other functions disclosed herein. Each is cemented, bonded, or otherwise secured to face 15c and to the inner wall of hole 15a of its backing member with the preferred securement shown specifically herein as bonding. Each has integrally connected together hole 16a extending at least partially therethrough, generally coaxial with hole 15a in the associated backing member for receiving shank 10b, of smaller diameter than hole 15a, generally cylindrical, and shown specifically as either through hole 16a–5 in FIGS. 10–13 or as partially through hole 16a–1 in FIGS. 4–7; a ring-like portion 16b located within and bonded to the wall of hole 15a in backing member 15; an annular center portion 16c extending around hole 16a, bonded to face 15c, extending axially downwardly beyond face 15c of the associated backing member, and shown specifically as center portion 16c–1 in FIGS. 4, 5, 10 and 11 or as center portion 16c–3 in FIGS. 6, 7, 12 and 13; the volume of rubber-like sealing material in annular center portion 16c being at least equal to the volume of hole 16a in sealing member 16; the radial distance, measured horizontally in FIGS. 4–7 and 10–13, from the axis of holes 15a and 16a to the outer edge of annular portion 16c being at least equal to one-half the distance from this axis to the outer edge of backing member 15; and integral film or thin sheet 16d extending outwardly from center portion 16c on backing member face 15c and bonded thereto. Each form of center portion 16c–1 or 16c–3 is substantially thicker than its associated film 16d, as measured axially of holes 15a and 16a–1 or 16a–5 from face 15c; each film 16d is preferably in a thickness range of 0.005–0.020 inch for best results; and on each washer form, annular center portion 16c–1 or 16c–3 and film 16d is substantially coextensive with, covers, and is bonded to the full opposite face 15c of its associated backing member.

The forms of washer in FIGS. 4–7 each have a thin, rubber-like web or diaphragm 16e extending across the lower end of hole 16a–1 to close this end remote from its associated backing member or steel plate, and formed integral with its associated center portion 16c–1 or 16c–3 as a part of its sealing member.

In FIGS. 10–13, each washer has its hole 16a–5 as a through hole.

The different forms of washer 14 have different surface configurations on their center portion 16c remote from their associated backing member 15. In FIGS. 6, 7, 12 and 13, surfaces 16f–3 on center portions 16c–3 are generally flat. In FIGS. 4, 5, 10 and 11, surfaces 16f–1 on center portions 16c–1 are generally conical.

Although the washer forms in FIGS. 1–14 may each be made by any siutable method or apparatus other than those shown in FIGS. 15–18, applicant prefers to make each of these washers by method or apparatus disclosed hereinafter and in FIGS. 15–18, or suitable modification thereof.

The disclosed method of making a bonded washer includes: (1) a step of forming one or more holes in a backing plate, (2) a molding step whereby one or more washers are at least partially made in a final molding position in FIG. 16 or 17, and (3) a blanking or cutting step in FIG. 18 wherein one or more individual washers are cut or trimmed from the plate in FIG. 15 after being formed in the molding position of FIG. 16 or 17. The method includes the following steps and utilizes the hereinafter described apparatus, or any other suitable apparatus.

A metal plate or sheet 15p has stamped, blanked or otherwise formed therein a plurality of spaced apart holes 15a in FIG. 15 which ultimately form holes 15a in any of the desired backing members shown in FIGS. 1–14, and a plurality of locating holes 15s therein for a purpose to be described hereinafter.

Then, a bonding agent is applied to plate side 15sc so as to later bond the rubber to this plate. This bonding agent may take the form of any conventional metal-to-rubber bonding adhesive; Typly made by Marbon Co., Erie, Indiana; or a metal-to-rubber adhesive having chlorinated rubber with or without Desmodur R (triphenylmethane triisocyanate), as disclosed on pages 622–623 in the book "Synthetic Rubber," by G. S. Whitby, 1954 Edition, or having approximately 50% solution of diphenyl-methane-4, 4-diisocyanate in o-dichlorobenzene, as disclosed on pages 128–129 in the book "Polyurethanes," by B. A. Dombrow, 1957 Edition.

Now, plate 15p is introduced into the molding apparatus. The apparatus in FIG. 16 is used to make washers having diaphragm 16e, as shown in FIGS. 4–7, while the apparatus in FIG. 17 is used to make washers having a through hole 16a–5, as shown in FIGS. 10–13.

In both FIGS. 16 and 17, a bottom die plate or die block 21 is provided upon which plate 15p may be placed with one side 15sc upper most, with other side 15sb facing downwardly and engaging block 21, and with locating holes 15s telescoped in snug engagement over locating pins 22 carried by die block 21 to locate plate 15p accurately thereon. Die block 21 has secured in holes therein the lower ends of core pins 23 in FIG. 16 or core pins 23' in FIG. 17. Each of these pins is of smaller diameter than the holes 15a in plate 15p and is telescopically and coaxially received in these holes while plate locating holes 15s are on locating pins 22 in the lower die block 21. Hence, these locating pins 22 locate the holes 15a in plate 15p equidistance from pins 23 or 23'.

A top die plate or die block 20 or 20' is provided respectively in FIG. 16 or 17. Each has a mold cavity 20a for forming the sealing member of the washers shown in FIGS. 4, 5, 10 or 11. Die block 20' has directly aligned with each of its pins 23' a guide hole 20b' closed by a plug 24' with this guide hole having a small clearance, such as 0.002–0.003 inch clearance, for receiving its associated core pin 23'.

The molding steps are provided with this apparatus. Die blocks 20 and 21 or die blocks 20' and 21, also commonly called mold plates, are adapted to be mounted in any conventional plastic molding machine with the upper die block 20 or 20' adapted to be moved along the direction of the arrow with respect to the lower die block 21 to either a mold open or mold closed position. In the closed position, the mechanism of the conventional molding machine is adapted to press the die blocks toward each other with high pressure.

Since the construction in FIGS. 16 and 17 works substantially identically, the operation of both will be described together. When top die block 20 or 20' is in its open or raised position, plate 15p may be placed on die block 21 on locating pins 22 in the manner described before. Then, a rubber-like sheet member (having material 25) of generally uniform thickness is placed on top of pins 23 or 23', on top of plate side 15sc, and beneath die block 20 or 20'. Now, the upper die block 20 or 20' has the die closing force applied thereto to move it downwardly while heat is applied to this rubber-like material 25 in any suitable matter, such as by any suitable type heaters 26 located either in the upper die block 20 or 20', in the lower die block 21, or in both die blocks. Heaters 26 may take the form of electric heaters or conduits conveying hot fluid through the appropriate die blocks in any conventional manner. As the dies are closed, a downward force is applied on the upper die block 20 or 20' to move the die blocks, mold cavities 20a, plate 15p, and pins 23 or 23' in relative approach movement into the final position shown in FIG. 16 or 17 wherein the rubber-like material 25 generally fills the mold cavities 20a to form center portions 16c–1 and is bonded to plate 15p on side 15sc.

In the final positions in FIGS. 16 and 17, the desired characteristics of the finished washers in FIGS. 4 and 5 and in FIGS. 10 and 11 are respectively obtained. Material 25 forms a rubber-like film 25d bonded to sheet 15p outwardly beyond cavities 20a, and this film ultimately becomes film 16d on the final washer in FIGS. 4, 5, 10 or 11. This material 25, upon application of heat and die closing force of sufficient amount, fills cavities 20a and forms this film 25d over side 15sc of plate 15p and under die 20 or 20' outwardly from cavities 20a. Good results may be obtained with neoprene as sheet material 25 when a closing force of 2000 p.s.i. and a temperature of 300° F. are used. Then, if the upper ends of pins 23 had been set at zero clearance relative to the upper end of cavities 20a when the mold is closed on plate 15p, but not on material 25, film 16d or 25d and web 16e will be formed of about the same thickness, about 0.010–0.015 inch. Ring-like portion 16b of rubber-like material is formed around each of the pins 23 or 23' and is bonded to the wall of the associated hole 15a in plate 15p. Cavities 20a are spaced apart similarly to pins 23 or 23', and each cavity is telescopically and coaxially located over its associated pin with its open end facing or opening toward plate side 15sc so as to form washer center portion 16c–1 in FIGS. 4, 5, 10 and 11.

Pins 23 and 23' are similarly spaced apart as holes 15a with each pin extending coaxially through its associated hole 15a and having an upper pin portion extending beyond the upper side 15sc of plate 15p coaxially with its associated cavity 20a to form a hole 16a–1 or 16a–5 in the rubber-like sealing members at least partially therethrough. In FIG. 16, the upper end of each pin 23 is in the final position shown spaced below the upper wall of its associated cavity 20a opposite plate 15p so as to form thin web 16e over the end of the pin 23 from the rubber-like material 25 while pin 23 forms hole 16a–1, shown in FIGS. 4 and 5. In FIG. 17, the upper end of each pin 23' is telescoped through an aligned guide hole 20b' in the final position illustrated in FIG. 17 so that a through hole 16a–5 will be formed therein, as shown in FIGS. 10 and 11. After die 20' is raised to its open position, the machine operator need merely sweep his hand over the tops of the pins 23' to break off the tops 25z formed from material 25. It should also be apparent that the apparatus in FIG. 17 may operate satisfactorily without the use of plugs 24', if so desired.

It should be readily apparent that the same finished washer structure, as now obtained by the FIG. 17 apparatus, will be obtained by having the upper ends of pins 23' carried by and fixed to upper die block 20' and the lower ends of these pins traveling in guide holes in die block 21, corresponding to guide holes 20b'. Then, pins 23' would not move down into coaxial relationship with holes 15a in plate 15p until the upper die 20' was being lowered to the final molding position.

After the upper die block 20 or 20' is raised to its open position, plate 15p may be raised to remove it from pins 23 or 23' and from pins 22.

Now, individual washers shown in FIGS. 4, 5, 10 and 11 may be blanked or cut from this plate 15p and film 25p by cutting the periphery of each washer therefrom with the apparatus shown in FIG. 18. Blanking of washer 14–6 in FIG. 11 is shown as an example. Here, blanking dies 30 and 31 are provided with die 31 being driven by suitable stamping or blanking mechanism, such as a punch press, toward and away from die 30 along the direction of the arrows so that circular edges 30a and 31a on these respective dies will shear off the circular periphery of backing member 15–6 and sealing member 16–6 from plate 15p. Recess 31b in die or punch 31 receives sealing member 16–6 with suitable clearance. Through hole 30b in die 30 permits die 31 to enter hole 30b at the end of the blanking operation, to receive blanked washer backing members 15–6, and to permit the previously blanked washers 14–6 to be driven upwardly therethrough by abutting contact. It has been found that this type of blanking die construction forms a washer with concave backing member 15–6, as shown in FIG. 11 and in the upper portion of FIG. 18, when cut from flat plate 15p; and the larger the hole 15a, the more concave is the resulting washer.

Washers with flat backing members, as shown in FIG. 10, may be formed by slight change in die 30. If hole 30b were a downwardly opening blind hole instead of a through hole, a pressure plate (located in this blind hole and pressing downwardly on the top of plate 15p in the closest approach position of dies 30 and 31), or any other suitable means, could be used to blank washers with flat backing members.

It should be apparent that this method may be used to make individual washers without blanking backing member 15–5 by dies 30 and 31. For example, if a previously formed backing member 15–5 is suitably located on pin 23', a complete washer 14–5 will be formed in FIG. 17 in the molding operation. Some trimming of flash 25d may be required.

It should be apparent that the apparatus in FIGS. 16, 17 and 18 could be utilized to make the washers in FIGS. 6 and 7 and in FIGS. 12 and 13 respectively by a slight change in shape of the mold cavities 20a, in shape of die cavities 30b and 31b, and in the lengths of the pins 23 or 23'.

Now, it should be apparent that this same method and apparatus shown in FIGS. 15–18 can be used, with only slight modification to manufacture any of the washer forms in FIGS. 4–7 and 10–13.

Now will be described the use of the different washer forms, as shown in FIGS. 1, 2, and 9. Since the description hereinafter generally applies generically to all of the washer forms in FIGS. 4–7, and 10–13, the description should be considered generic to all of these washers unless specifically limited to any one washer, and will refer generically to washer 14, backing member 15 and sealing member 16 and their component parts in speaking of all washer forms.

Washer 14 is assembled on screw 10 by inserting shank 10b through hole 16a–1 or 16a–5 in the washer until head 10a engages backing member face 15b curing this assembly. Then, web 16e is easily broken and would fill the roots of the thread on shank 10b on the lower side of the washer in FIG. 2. At least a portion of hole 16a–1 or 16a–5 is of smaller diameter than the outside diameter of shank 10b to provide a frictional fit to prevent disassembly of the washer from the screw. This hole may be cylindrical or slightly tapered, whichever is preferred, to provide this frictional grip. Punctured web 16e will additionally provide this frictional gripping function.

Now, this assembled washer and screw in FIG. 2 is moved into the assembled position in FIG. 1 by having shank 10b inserted through hole 12a and then applying an axial downward and turning force to head 10a so that the threads on shank 10b, whether these shank threads be self-tapping to form threads in hole 13a or be ordinary screw threads screwed into a previously tapped hole 13a, will enter into member 13 into the assembled position in FIG. 1 with sealing member 16 being deformed laterally and axially into the shape shown in FIG. 1. If the proper amount of tightening torque is applied to bolt 10, backing member 15 will be flat in assembled position, as shown in FIG. 1, even though it was initially concave, as shown in FIGS. 5, 7, 11 and 13, or flat as shown in FIGS. 4, 6, 10 and 12.

Now, these different washer forms have many generic advantages during and after the parts are moved into the assembled position in FIG. 1.

First, metal backing member 15 has several advantages. It serves as a bearing for relative turning movement of screw head 10a so as to not distort rubber-like sealing member 16 by this screw head turning movement. Ring-portion 16b does not extend above face 15b thereof prior to applying a substantial amount of driving force to screw 10 so that face 15b may provide head 10a with metal-to-metal bearing engagement. When the parts reach the assembled position in FIG. 1, backing member 15 will be flat even though it may have started out as a concave backing member, such as shown in FIGS. 5, 7, 11 and 13.

Second, the thickness of center portion 16c–1 or 16c–3 adjacent hole 16a–1 or 16a–5 provides advantages. In the assembled position in FIG. 1, this thickness assures that the rubber-like material will grip shank 10b securely, that more of this rubber-like material will be forced down into at least hole 12a so as to seal holes 12a and 13a as shown by rubber-like portion 16p in FIG. 1, that this rubber-like material will provide better sealing between members 12 and 15 under pressure, and that the tight fit of hole 16a–1 or 16a–5 (with or without punctured web 16e) on shank 10b will assure that portion 16p in FIG. 1 of the rubber-like material will be carried by the threads down into at least hole 12a, and preferably also into hole 13a, to provide a better seal.

Third, in the assembled position, rubber-like sealing member 16 will not have its outer edge 16n in FIGS. 1 and 9 extending outwardly beyond the outer edges of backing member 15 because of the shape and characteristics of the parts, and for the reasons to be given hereinafter. The rubber-like outer edge 16n in FIG. 9, formed by compressed center portion 16c, will be kept within the outer edges of backing member 15 even under extreme compression. This is important because this feature improves the appearance of washer 14 and prevents progressive deterioration of the rubber-like material by having backing member 15 protect rubber-like member 16 from sun light and exposure to other elements when member 12 is exterior sheeting on a building. The improved appearance results because metal members 12 and 15 are the only ones exposed in use so that the building appears to have a continuous metal outside face instead of having rings of rubber thereon, as would appear if edge 16n of member 16 extended beyond the outer edges of backing member 15 in FIG. 9.

Although edge 16n does not extend beyond the outer edges of backing member 15 in FIGS. 1 and 9, it should be apparent that if backing member 15 were of smaller diameter, rubber edge 16n would extend beyond this backing member edge in FIG. 1.

Fourth, ring-like portion 16b, bonded to the wall of hole 15a, provides advantages. This portion 16b resists lateral outward spread of the remainder of sealing member 16 in FIG. 1 by the axial assembling force by being secured to the bore surface of the hole in said backing member and by engaging said bore surface in barb-like fashion to resist said lateral outward spread so that the outer edge 16n of member 16 is easily kept within the outer edge of backing member 15. Portion 16b provides at all times a positive seal between head 10a, backing member 15 and shank 10. Ring-like portion 16b has a hole throughout its length approximately the same diameter as the outside diameter of the shank of fastener 10 engageable therewith and has its end face (top face in the drawings) substantially coplanar with backing member top face 15b so as to fit substantially against the underside of fastener head 10a in FIG. 2 prior to fastener driving. Ring-like portion 16b not only provides fastener gripping action in backing member bore 15a but also substantially fills the space under head 10a and around shank 10b within hole 15a from the time of assembly of the washer and fastener throughout the driving of said fastener. No moisture containing pocket is provided therebetween with the danger of this moisture being forced by the compression of the rubber-like sealing member 16 down into the threaded hole 12a, 13a. Sealing member 16 is effectively sealed on fastener 10 even if the driving force, such as a low driving torque for screw 10, is not sufficient to substantially compress sealing member 16. However, if screw 10 is tightened with sufficient torque, the axial upward force applied to rubber-like member 16 in FIG. 1 will force portion 16b to seal against the underside of head 10a. Center portion 16c–1 or 16c–3 and ring-like portion 16b combine to provide the maximum amount of rubber-like material adjacent to the shank 10b where it is most needed to seal holes 12a and 13a and to seal the space between members 12 and 15.

Fifth, advantages are provided by the thin sheet of rubber-like material or film 16d bonded to face 15c of backing member 15. This film 16d resists lateral outward movement of center portion 16c–1 or 16c–3 so that this rubber-like center portion will be crowded inwardly into sealing engagement with shank 10b. As this center portion 16c–1 or 16c–3 attempts to move laterally outwardly over member 12, it will form lip 16n on the outer edge of fold 16m bearing in face-to-face contact in FIG. 9 against the underside of bonded film 16d integrally formed of the same material. This rubber-to-rubber surface contact by the same material along fold 16m will cause increased resistance by cohesional and frictional forces of engagement of the same rubber materials resisting outward movement of lip or outer edge 16n because film 16d is firmly bonded to rigid metal member face 15c. Also, outwardly curling lip 16n forms with the outer edge of film 16d two fluid seal lips effectively sealing the space at the bottom and the top between members 12 and 15. Also, film 15d prevents any electrolytic corrosion action tended to be caused by liquid, such as rain water on the exterior of a building, and by any dissimilarily in metal material of members 12 and 15, such as when they are made of aluminum and steel respectively. Even when the water gets in the space under film 16d in FIG. 9 between members 12 and 15, the electrical insulating film 16d, which covers the entire face 15c of backing member 15, will prevent the electrolytic action.

All of these advantages are provided by a simple rubber-like member construction in washer 14. Ring-like portion 16b, center portion 16c and film 16d are integrally formed from the same rubber-like material.

Now, it should be apparent that with this construction, especially with bonded film 16d and bonded portion 16b, the washers will have a good sealing action, outer lip 16n of sealing member 16 will not be exposed beyond the outer edge of backing member 15, and backing member 15 will be protected by film 16d on its under face against corrosion by electrolytic action even though the washers may be made in a wide variety of shapes and sizes, may have holes 16a–1 or 16a–5 varying in shapes and sizes, and may be assembled in the FIG. 1 position by a wide range of torques or axial forces. Hence, good results may be obtained with a wide variation in the different washer forms as to shape, size, manufacturing tolerance, or tightening torque tolerance.

Although the description in the preceding paragraphs of the component parts, structure, mode of operation and advantages has been given only for screw 10 in FIGS. 1–3, it will be apparent that this same description applies generically to screw 10' in FIGS. 20–22.

However, screw 10' has many additional generic advantages when assembled with any of the different washers in FIGS. 4, 5, 6, 7, 10, 11, 12 or 13, and when these parts are moved into and reach the assembled position in FIG. 21. Screw 10' has shoulder 10d' located between head 10a and the driving portion 10c' of shank 10b' having a periphery taking the form of either a smooth nail or threaded portion 10c'. Shoulder 10d' is circular in cross section, cylindrical in form, and has a cross sectional diameter or dimension greater than the diameter of the hole in member 11 receiving driving portion 10c' contiguous to shoulder 10d'. In a threaded hole, this last mentioned diameter is the minimum or inside diameter of the threaded hole. However, this dimension preferably is, when the shank is threaded, either at least equal to or greater than the outside diameter of the threads on portion 10c' and, when shank 10b' is a smooth nail, greater than the diameter of driving portion 10c' of this nail.

The axial length L in FIG. 19 is carefully selected so as to automatically stop fastener 10' in preselected driven or assembled position P in FIG. 21 (similar to FIG. 1) giving the best sealing action. Axial length L is such that when the lower end of shoulder 10d' is driven against and abuts against in FIG. 21 the outer or upper surface of fastener receiver member 11, such as against member 12 around hole 12a smaller in diameter than shoulder 10d', this shoulder will stop driving travel of driving portion 10c' into hole 12a, 13a in position P with sealing member 16 properly sealing hole 12a, 13a. Shoulder 10d' not only provides an end-stop for assuring that the same consistent, good sealing is always obtained but also provides other advantages enumerated in the paragraphs hereinafter.

First, shoulder 10d' increases the strength of fastening element 10' in FIG. 19 by reducing the stress concentration found in fastening element 10 in FIG. 2 under head 10a.

Second, the smooth and cylindrical exterior surface on shoulder 10d' provides several advantages. First, it minimizes tearing of sealing member 16 compared with contact by the rough threads in FIG. 1. Second, it gives a better and tighter sealing action with bore 16a because of its smooth cylindrical exterior surface at least as large as the outside diameter of threads 10c'.

Third, while fastener 10 is being driven into hole 12a, 13a and is approaching position P, shoulder 10d' acts as a driving ram for forcing under high pressure rubber-like portion 16p of sealing member 16 down into hole 12a, 13a and around threads 10c' to assure a good seal there.

Fourth, when position P is reached, three separate and independent seals are provided. Metal shoulder 10d' firmly abuts against metal member 12 to form a metal-to-metal seal S1 there. This forms first seal S1 sealing the compressed rubber-like sealing portion 16p in hole 12a, 13a as second seal S2 separated from third seal S3 provided by rubber-like material 16b, 16d and 16n of sealing member 16 sandwiched between, laterally spread by and sealing between fastener 10', backing member 15 and fastener receiving member 12.

Fifth, shoulder 10d' accurately and consistently determines position P. By thus preventing fastener overtravel into hole 12a, 13a, shoulder 10d' prevents reverse dishing of backing member 15 out of the desirable flat position in FIG. 21 into an undesirable concave upward shape and prevents over-compressing sealing member by either extruding a portion of member 16 out beyond the peripheral boundary of member or ruining the seal provided by member 16.

Shoulder 10d' may vary in length L and in diameter while still having the same advantages and generally the same structure mentioned heretofore. For example, it may be desirable to make it in the form of shoulder 10d'', shown in bottom and in left and right side outlines in dot-dash lines in FIG. 21, so as to stop shoulder 10d'' against a different portion of fastener receiver member 11, such as against the outer or upper surface of member 13. This cylindrical shoulder 10d'' (being at least as large in diameter as the outside diameter of threads 10c' in the preferred form but being in minimum diametrical dimension always greater in diameter than the inside diameter of hole 13a; and also being smaller in diameter and axially longer in dimension L than shoulder 10d') may be preferably used when either hole 12a is predrilled, or otherwise formed, of slightly larger diameter than hole 13a or member 12 is formed of material easily deformed by shoulder 10d'' during its downward axial driving travel in FIG. 21.

Various changes in details and arrangement of parts can be made by one skilled in the art without departing from either the spirit of this invention or the scope of the appended claims.

What is claimed is:

1. A washer for use with a fastening element, comprising a shank having a head at one end, said washer comprising a backing member having one face adapted to bear against said head and having a hole extending therethrough to receive said shank, a rubber-like sealing member secured to the opposite face of said backing member and having a hole extending at least partially therethrough and being generally coaxial with the hole in said backing member for receiving said shank, said sealing member including an annular portion around the hole in said sealing member, the volume of rubber-like sealing material in said annular portion being at least equal to the volume of the hole in said sealing member, the radial distance from the axis of said holes to the outer edge of said annular portion being at least equal to one-half the distance from said axis to the outer edge of said backing member, said annular portion being constructed, proportioned and arranged so that the maximum volume of rubber-like material is provided adjacent to the shank where needed to seal said hole in said backing member and to seal the space between said backing member and receiving member, and so that when said shank is inserted through said holes until said head engages said one face and the shank of said fastening element is inserted into a hole in a fastener receiving member by an axial force with said annular portion sandwiched between said backing member and receiving member, the rubber-like annular portion will be crowded inwardly into sealing engagement with the shank, the hole in the receiving member, and the space between said backing and receiving members, an integral film extending outwardly from said annular portion and covering with said annular portion said full opposite face, said center portion being substantially thicker than said film measured axially from said opposite face, said annular portion and film of said sealing member being integrally formed of the same rubber-like material and being constructed so that tightening said fastener to apply an axial force will cause good sealing by said sealing member but with said film resisting outward spread of said annular portion by the cohesional and frictional engagement force between the same rubber-like material in each so as to resist travel of said sealing member beyond the periphery of said backing member and to provide fluid seal lips by the outer edges of said film and said outwardly spread annular portion sealing the space between said backing and receiving members in said assembled position.

2. A washer, as set forth in claim 1, with said film being approximately 0.005 to 0.020 inch thick.

3. A washer, as set forth in claim 1, with said sealing member having an integral ring-like portion located within the hole in said backing member, said ring-like portion having a hole throughout its length approximately the same diameter as the outside diameter of the fastener for gripping engagement therewith to provide a good seal with the fastening element even when said element is only partially driven and having its end face substantially coplanar with said one face of said backing member to fit substantially against said fastener head prior to fastener driving, said ring-like portion secured to the wall of the hole in said backing member and with said annular portion of sealing member extending beyond the opposite face of said backing member, said hole in said backing member being a through hole and being of generally uniform diameter substantially larger than the hole in said sealing member, whereby said ring-like portion resists lateral outward spread of said other portion by said axial force by being secured to the bore surface of the hole in said backing member and by engaging said bore surface in barb-like fashion to resist said lateral outward spread, said ring-like portion not extending above said one face prior to applying a substantial amount of said axial force so that said one face of said backing member is adapted to have bearing engagement with said head during driving of said fastener but said ring-like portion substantially fills the space under said head and around said shank within the hole in said backing member from the time of assembly of the fastening element and washer throughout the driving of said fastening element, said sealing member is adapted to be squeezed through said through hole in said backing member against said head after applying a substantial amount of said axial force so as to seal between said head and backing member.

4. A washer, as set forth in claim 1, with said backing member being flat before assembly on the shank of said fastening element.

5. A washer, as set forth in claim 1, with said backing member having said opposite face concave before assembly on the shank of said fastening element.

6. A washer, as set forth in claim 1, with said sealing member having a thin web portion extending across said hole in said sealing member before assembly on the shank of said fastening element.

7. A washer, as set forth in claim 1, said sealing member having a thin web portion extending across said hole in said sealing member before assembly on the shank of said fastening element, said backing member being flat before assembly on the shank of said fastening element.

8. A washer, as set forth in claim 1, said sealing member having a thin web portion extending across said hole in said sealing member before assembly on the shank of said fastening element, said backing member having said opposite face concave before assembly on the shank of said fastening element.

9. A washer, as set forth in claim 1, with said sealing member having its hole as a through hole before assembly on the shank of said fastening element.

10. A washer, as set forth in claim 1, with said sealing member having its hole as a through hole before assembly on the shank of said fastening element, said backing member being flat before assembly on the shank of said fastening element.

11. A washer, as set forth in claim 1, with said sealing member having its hole as a through hole before assembly on the shank of said fastening element, said backing member having said opposite face concave before assembly on the shank of said fastening element.

12. A washer, as set forth in claim 1, with said annular portion having a generally flat surface remote from said backing member.

13. A washer, as set forth in claim 1, with said annular portion having a generally conical surface remote from said backing member, converging toward said axis at an intersection of said axis at a point farther from said backing member than said annular portion to form a generally conical annulus extending along the axial length of said annular portion, and located on the periphery of said annular portion.

14. A combination of a washer and a fastening element, said fastening element comprising a threaded shank carrying a head at one end; said washer comprising a backing member having one face adapted to bear against said head and having a hole extending therethrough to receive said shank, a rubber-like sealing member secured to the opposite face of said backing member and having a hole extending at least partially therethrough and being generally coaxial with the hole in said backing member for receiving said shank, said sealing member including an annular portion around the hole in said sealing member, the volume of rubber-like sealing material in said annular portion being at least equal to the volume of the hole in said sealing member, the radial distance from the axis of said holes to the outer edge of said annular portion being at least equal to one-half the distance from said axis to the outer edge of said backing member, said annular portion being constructed, proportioned and arranged so that the maximum volume of rubber-like material is provided adjacent to the shank where needed to seal said hole in said backing member and to seal the space between said backing member and receiving member, and so that when said shank is inserted through said holes until said head engages said one face and the shank of said fastening element is inserted into a hole in a fastener receiving member by an axial force with said annular portion sandwiched between said backing member and receiving member, the rubber-like annular portion will be crowded inwardly into sealing engagement with the shank, the hole in the receiving member, and the space between said backing and receiving members, an integral film extending outwardly from said annular portion and covering with said annular portion said full opposite face, said annular portion being substantially thicker than said film measured axially from said opposite face, said annular portion and film of said sealing member being integrally formed of the same rubber-like material and being constructed so that tightening said fastener to apply an axial force will cause good sealing by said sealing member but with said film resisting outward spread of said annular portion by the cohesional and frictional engagement force between the same rubber-like material in each so as to resist travel of said sealing member beyond the periphery of said backing member and to provide fluid seal lips by the outer edges of said film and said outwardly spread annular portion sealing the space between said backing and receiving members in said assembled position.

15. A combination, as set forth in claim 14, with said fastening element having the threads on its shank extending to said head.

16. A combination, as set forth in claim 14, with said fastening element having its shank including a threaded portion and an axially extending shoulder, said shoulder being located between said threaded portion and head and having a cross sectional dimension at least equal to the outside diameter of said threaded portion, said shoulder having such axial length that when the shoulder abuts against a surface of said fastener receiving member, it will stop driving travel of said threaded portion into the hole in said fastener receiving member in a preselected driven position with said rubber-like sealing member properly sealing said last mentioned hole, said shoulder increasing the strength of the fastening element by reducing stress concentration at sharp corners under the head, the exterior surface of said shoulder being smooth and cylindrical to minimize tearing of and to give better sealing with said rubber-like member, said shoulder during travel into said preselect driven position acting as a driving ram for forcing a portion of the rubber-like material into and to seal the hole in the fastener receiving member and around the threads on said shank, said shoulder in said preselected driven position engaging said fastener sealing member with a metal-to-metal seal when said sealing member and fastening element are metal to seal the compressed rubber-like sealing material in said last mentioned hole from the seal provided by the rubber-like material in said sealing member sandwiched between, laterally spread by and sealing between said fastener, backing member and fastener receiving member so that three separate independent seals are provided, said shoulder in said preselected driven position preventing overtravel of said fastening element into the hole in said fastener receiving member tending to reverse dish said backing member and to overcompress said sealing member.

17. In combination, a washer, and a fastening element comprising a shank carrying a head at one end, said shank including a driving portion adapted to be driven into a hole in a fastener receiving member and including an axially extending shoulder, said shoulder being located between said driving portion and head and having a cross sectional dimension greater than the diameter of the hole into which said driving portion is driven, said washer comprising a backing member having one face bearing against said head and having a hole extending therethrough, a rubber-like sealing member carried by the opposite face of said backing member and having a hole extending therethrough and being generally coaxial with the hole in said backing member with a bore sealing portion thereof axially aligned with and underlying said shoulder on the side opposite said head and engaging the periphery of said shoulder throughout its axial length, said shank and shoulder being telescoped through said holes, during driving of said fastening element, said head engaging said one face of said backing member and being freely rotatable thereon without contacting the portion of said sealing member secured to said opposite face, and said shoulder having such axial length that when the shoulder abuts against a surface of said fastener receiving member, it will stop driving travel of said driving portion into the hole in said fastener receiving member in a preselected driven position with said rubber-like sealing member properly sealing said last mentioned hole, said driving portion being externally threaded so that said fastening element is driven by a screwing action, said head freely rotatable on said one face without said head engaging and rotating said secured portion of said sealing member, said sealing member being bonded to said opposite face, said shoulder increasing the strength of the fastening element by reducing stress concentration at sharp corners under the head, the exterior surface of said shoulder being smooth and cylindrical to minimize tearing of and to give better sealing with said rubber-like member, said shoulder during travel into said preselected driven position acting as a driving ram for forcing some of said bore sealing portion of the rubber-like material into and to seal the hole in the fastener receiving member and around the threads on said shank, said shoulder in said preselected driven position engaging said fastener sealing member with a metal-to-metal seal when said sealing member and fastening element are metal to seal the compressed rubber-like sealing material in said last mentioned hole from the seal provided by the rubber-like material in said sealing member sandwiched between, laterally spread by and sealing between said fastener, backing member and fastener receiving member so that three separate and independent seals are provided, said shoulder in said preselected driven position preventing overtravel of said fastening element into the hole in said fastener receiving member tending to reverse dish said backing member and to overcompress said sealing member.

References Cited by the Examiner

UNITED STATES PATENTS

| | | | |
|---|---|---|---|
| 1,356,404 | 10/20 | Robinson | 85—50 |
| 2,439,516 | 4/48 | Holcomb. | |
| 2,756,795 | 7/56 | Clingman | 85—50 |
| 2,761,347 | 9/56 | McKee | 85—1 |
| 2,783,502 | 3/57 | Abplanalp | 18—4 |
| 2,878,517 | 3/59 | Cramer | 18—42 |
| 2,923,035 | 2/60 | Schwartz | 18—42 |
| 2,927,495 | 3/60 | Barwood | 85—1 |
| 2,983,534 | 5/61 | Heller et al. | 85—50 |

FOREIGN PATENTS

| | | |
|---|---|---|
| 534,439 | 3/41 | Great Britain. |
| 690,269 | 4/53 | Great Britain. |

CARL W. TOMLIN, *Primary Examiner.*

EDWARD C. ALLEN, *Examiner.*

UNITED STATES PATENT OFFICE
CERTIFICATE OF CORRECTION

Patent No. 3,202,033                                                      August 24, 1965

Harry C. Weidner, Jr.

It is hereby certified that error appears in the above numbered patent requiring correction and that the said Letters Patent should read as corrected below.

Column 8, line 69, for "dissimilarily" read -- dissimilarity --; column 10, line 15, after "member" insert -- 15 --.

Signed and sealed this 13th day of September 1966.

(SEAL)
Attest:

ERNEST W. SWIDER                                             EDWARD J. BRENNER
Attesting Officer                                                Commissioner of Patents